(12) United States Patent
Oberheide (10) Patent No.: US 7,059,669 B2
(45) Date of Patent: Jun. 13, 2006

(54) SUNROOF

(75) Inventor: G. Clarke Oberheide, Troy, MI (US)

(73) Assignee: Intier Automotive Closures Inc., Newmarket (CA)

( * ) Notice: Subject to any disclaimer, the term of this patent is extended or adjusted under 35 U.S.C. 154(b) by 0 days.

(21) Appl. No.: 10/839,041

(22) Filed: May 5, 2004

(65) Prior Publication Data

US 2004/0222675 A1  Nov. 11, 2004

Related U.S. Application Data

(60) Provisional application No. 60/469,581, filed on May 9, 2003.

(51) Int. Cl.
*B60J 7/057* (2006.01)

(52) U.S. Cl. .................... 296/223; 296/216.03
(58) Field of Classification Search ........... 296/216.02, 296/216.03, 222, 223
See application file for complete search history.

(56) References Cited

U.S. PATENT DOCUMENTS

| 4,223,942 A | * | 9/1980 | DeLuca ...................... 296/222 |
| 4,659,140 A | | 4/1987 | Fuerst et al. |
| 4,678,228 A | | 7/1987 | Boots |
| 4,690,453 A | | 9/1987 | Niwa |
| 4,732,422 A | | 3/1988 | Schlapp et al. |
| 4,893,869 A | | 1/1990 | Fuerst |
| 4,978,165 A | | 12/1990 | Schreiter et al. |
| 5,058,947 A | | 10/1991 | Huyer |
| 5,238,290 A | * | 8/1993 | Farmont ................ 296/216.03 |
| 5,405,185 A | | 4/1995 | Cheron et al. |
| 6,296,302 B1 | | 10/2001 | Lenkens |

FOREIGN PATENT DOCUMENTS

| DE | 003536184 | * 11/1986 | ............ 296/216.03 |
| DE | 3532111 | 3/1987 | |
| JP | 60163723 | 8/1985 | |
| JP | 61060321 | 3/1986 | |
| JP | 62265020 | 11/1987 | |
| JP | 62265022 | 11/1987 | |
| JP | 3169740 | 7/1991 | |

* cited by examiner

Primary Examiner—Dennis H. Pedder
(74) Attorney, Agent, or Firm—Clark Hill PLC

(57) ABSTRACT

A closure panel assembly selectively covers an opening formed in a roof of a motor vehicle. The closure panel assembly includes a frame disposed around the opening of the roof. The frame has a longitudinal wall including a guide slot extending between a forward end and a rearward end. A lead screw is disposed adjacent the longitudinal wall and is movable with respect thereto. A panel is movable relative to the lead screw for selectively covering the opening. A sliding bracket is secured to the panel and includes a drive nut extending through the guide slot to threadingly engage the lead screw. The rotation of the lead screw allows for movement of the drive nut to move the panel between an open position and a closed position.

7 Claims, 7 Drawing Sheets

SUNROOF

This application claims the benefit of Provisional Application No. 60/469,581, filed May 9, 2003.

FIELD OF THE INVENTION

The invention relates to a closure panel assembly for selectively covering an opening in a motor vehicle. More particularly, the invention relates to a closure panel assembly including a panel that slides between a closed position and an open position outside the motor vehicle.

DESCRIPTION OF RELATED ART

A sunroof is a popular optional accessory item for a motor vehicle. The sunroof typically includes a closure panel that is movable relative to an opening formed through a roof of the motor vehicle. The closure panel is movable between a closed position generally flush with the roof that completely covers the opening, and an open position rearward of the closed position for allowing ventilation and/or sunlight to enter a passenger compartment of the motor vehicle. In addition, the closure panel is typically positionable at one of a plurality of partially open positions between the closed and open positions. The closure panel may be moved manually or via an electric motor. Various sunroofs are well-known to those skilled in the art and are disclosed in U.S. Pat. Nos. 4,678,228; 4,690,453; 4,732,422; 4,893,869; 5,058,947; and 5,405,185.

There are two types of sunroofs. The first is where the closure panel is retracted into the structure of the roof, when open, where it is hidden from view. The second type of sunroof, which is commonly known as a spoiler type sunroof, includes a lifting mechanism to raise the closure panel to a sufficient height so that the closure panel will clear the roof thereabove during sliding away from its closed position. This lifting mechanism must also account for positioning the closure panel flush with the surrounding roof when the closure panel is in the closed position. It is important that a tight seal is formed between the roof and the closure panel when the closure panel is in the closed position to prevent air, moisture, and noise from entering the passenger compartment of the motor vehicle. But maintaining the tight seal between the closure panel and the roof becomes more difficult over time as the multitude of parts that provide for lifting and sliding of the closure panel are exposed to wear and tear. Thus, it would be desirable to provide a mechanism that lifts and slides a closure panel relative to a roof of a motor vehicle, and that maintains the closure panel flush with the surrounding roof to provide a tight seal therebetween.

SUMMARY OF THE INVENTION

A closure panel assembly selectively covers an opening formed in a roof of a motor vehicle. The closure panel assembly includes a frame disposed around the opening of the roof. The frame has a longitudinal wall including a curved guide slot extending between a forward end and a rearward end. A lead screw is disposed adjacent the longitudinal wall and pivots at one end with respect thereto. A panel is movable relative to the lead screw for selectively covering the opening. In addition, a sliding bracket is secured to the panel and includes a drive nut extending through the guide slot to threadingly engage the lead screw. The rotation of the lead screw allows for movement of the drive nut to move the panel between an open position and a closed position.

BRIEF DESCRIPTION OF THE DRAWINGS

Advantages of the invention will be readily appreciated as the same becomes better understood by reference to the following detailed description when considered in connection with the accompanying drawings wherein.

DETAILED DESCRIPTION OF THE PREFERRED EMBODIMENT

Figure 1:
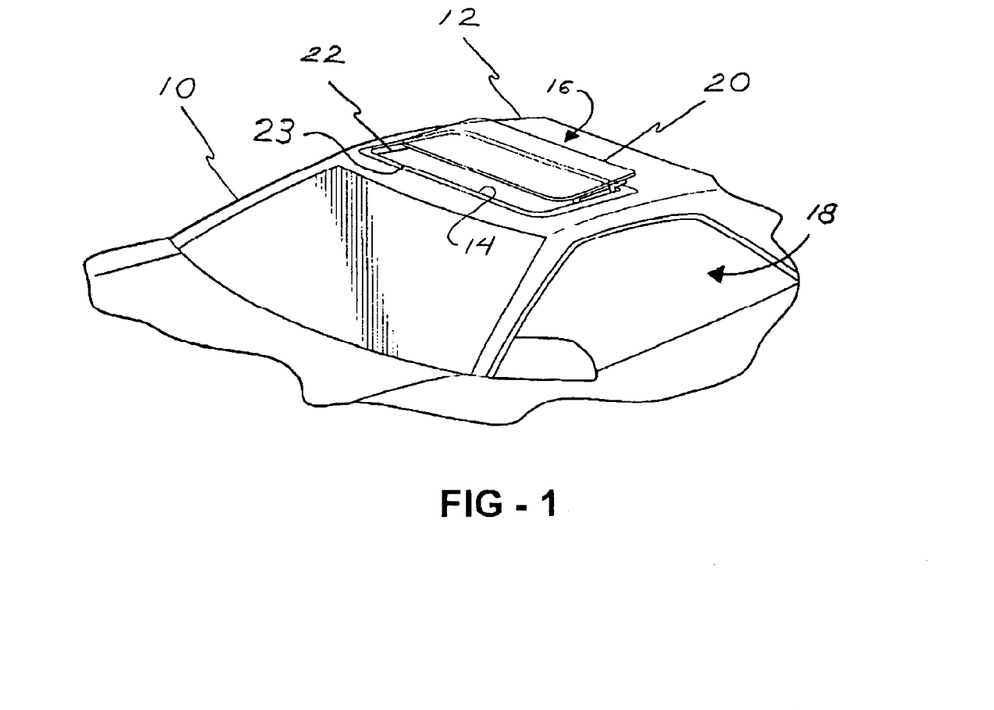
FIG. 1 is a fragmentary perspective view of a motor vehicle including a closure panel assembly according to the invention, shown in a partially open position.

Referring to FIG. 1, a motor vehicle 10 includes a roof 12 defining an opening 14 therethrough. A closure panel assembly, generally shown at 16, selectively covers the opening 14 to allow sunlight and/or ventilation to enter a passenger compartment 18 of the motor vehicle 10. The closure panel assembly 16 includes a panel 20 that is removably securable to the roof 12 to cover the opening 14, and a frame 22 disposed around the opening 14 of the roof 12. A sealing member 23 extends along the frame 22 to provide a tight seal between the panel 20 and the frame 22 when the opening 14 is completely covered by the panel 20. Although the frame 22 in FIG. 1 is generally rectangular-shaped, it will be appreciated that the shape of the frame 22 may vary depending on the configuration of the opening 14. Further, it is contemplated that the frame 22 may be integrally formed with the roof 12, or that the roof 12 may contain a plurality of openings.

Figure 2:
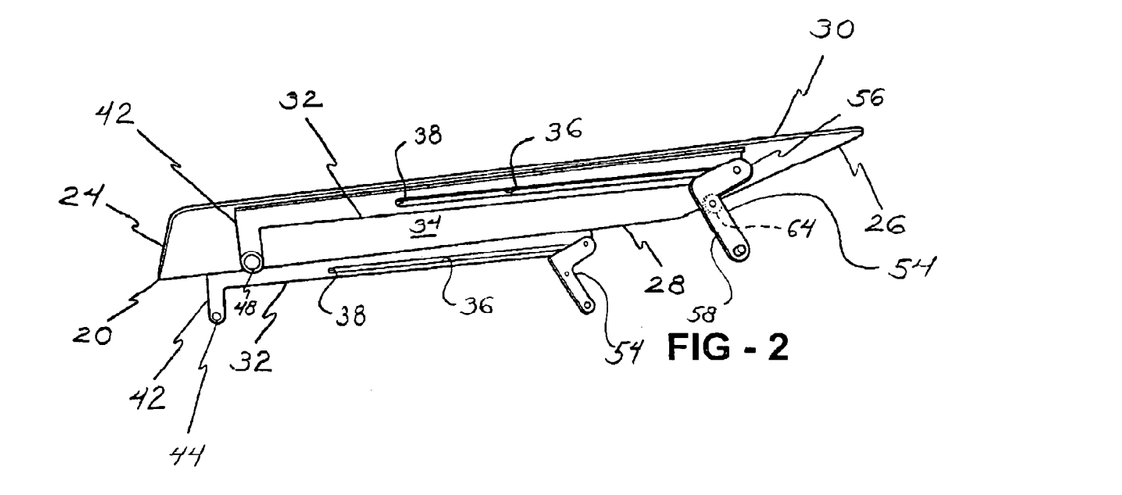
FIG. 2 is a side perspective view of a panel of the closure panel assembly.

Referring to FIG. 2, the panel 20 includes a front edge 24, a rear edge 26, and side edges 28, 30 extending therebetween. The panel 20 is generally planar, and is preferably glass or polycarbonate. It is, however, contemplated that the panel 20 may be non-planar.

Figure 3:
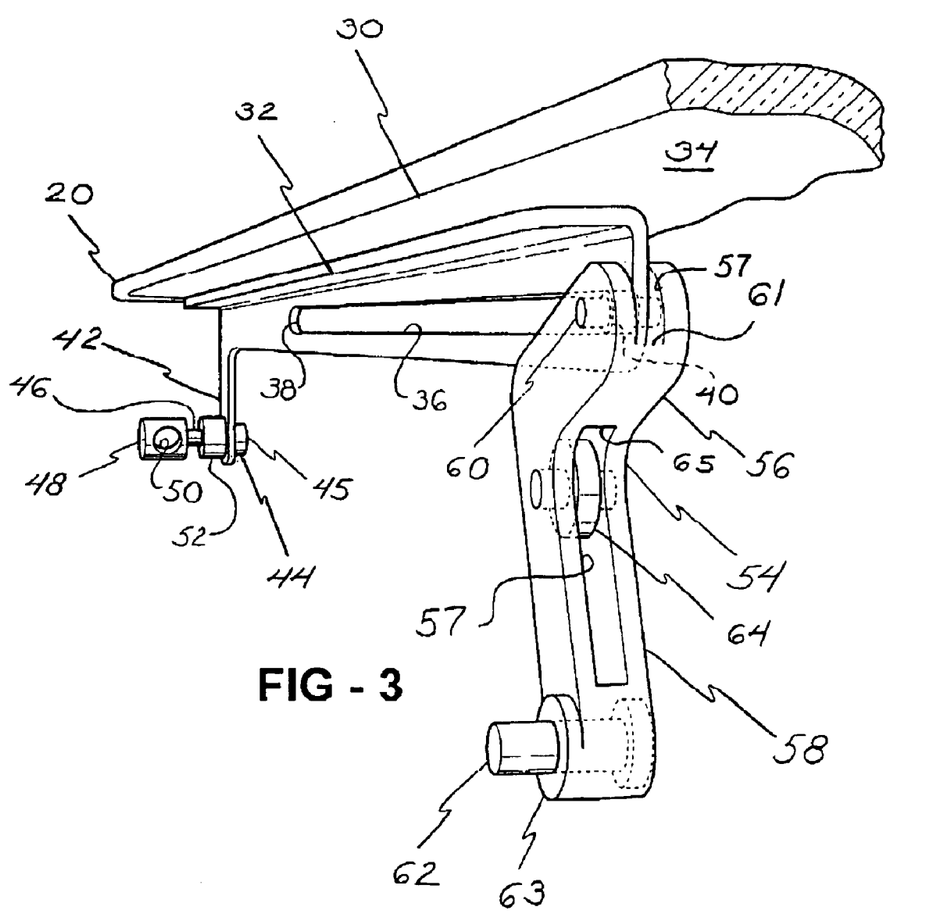
FIG. 3 is a rear, fragmentary, perspective view of the panel of the closure panel assembly with a sliding bracket having an L-shaped hinge bracket in the foreground and a drive nut in the background.

Referring to FIGS. 2 and 3, a pair of parallel and spaced apart sliding brackets 32 is mounted to a bottom surface 34 of the panel 20. One of the pair of sliding brackets 32 is adjacent one of the side edges 28 while the other of the pair of sliding brackets 32 is adjacent the other side edge 30. Each of the pair of sliding brackets 32 defines a length and includes an elongated slot 36 extending along a portion of the length. Each of the elongated slots 36 extends between a front end 38 and a rearward end 40 defining a travel direction for the panel 20.

Referring to FIG. 3, each of the sliding brackets 32 includes a forward leg 42. The forward leg 42 extends downwardly from the sliding brackets 32. A pin 44 extends through each distal end of the forward legs 42 perpendicularly to the sliding brackets 32. Each pin 44 includes a head 45 and a shank 46 extending therefrom through the forward leg 42. A drive nut 48 is secured to the shank 46 opposite the head 45. The drive nut 48 has a threaded through-hole 50. A spacer 52 is mounted to the shank 46 and is disposed along a portion thereof between the forward leg 42 and the drive nut 48.

The closure panel assembly 16 also includes L-shaped hinge brackets 54 that extend between the sliding brackets 32 and the frame 22. The L-shaped hinge brackets 54 include a first leg 56. A first pin 60 extends out of the first leg 56 and through the elongated slot 36 of the sliding bracket 32. In the embodiment shown, the first leg 56 defines a channel 57 across which the first pin 60 extends. A forward end 59 of the channel 57 defines an upper lip 61, over which the sliding bracket 32 passes to allow the panel 20 to move from its closed position to its open position. In addition, a portion of the sliding bracket 32 extends into the channel 57 allowing for a more compact, low profile when the panel 20 is in its open position.

Each of the L-shaped hinge brackets 54 also includes a second leg 58, which extends out from the first leg 56 substantially perpendicularly thereto. A second pin 62 extends out from a distal end 63 of the second leg 58. The second pin 62 extends through the frame 22. The second pin 62 defines a pivot point about which the L-shaped hinge bracket 54 pivots. The channel 57 continues from the first leg 56 down through the second leg 58.

Figure 7:
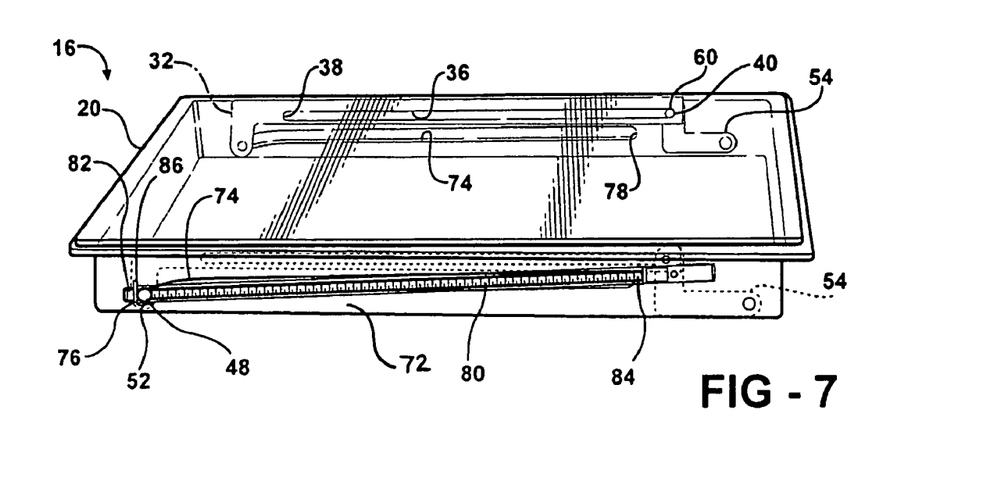
FIG. 7 is an isolated, perspective view of the closure panel assembly with the panel in the closed position and a hinge bracket in a rest position.
Figure 10:
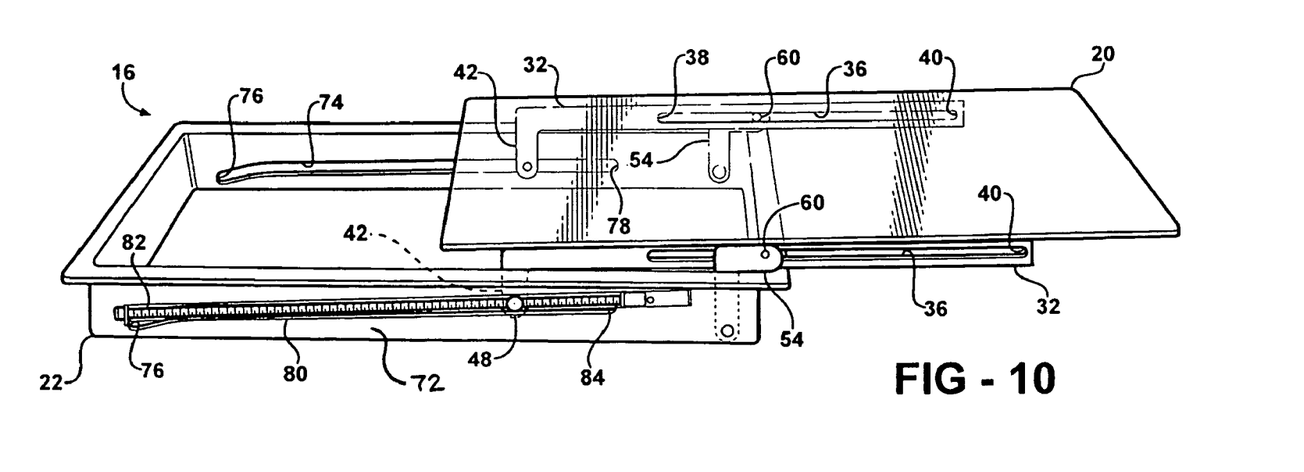
FIG. 10 is an isolated, perspective view of the closure panel assembly with the hinge bracket in an upright position.
Figure 11:
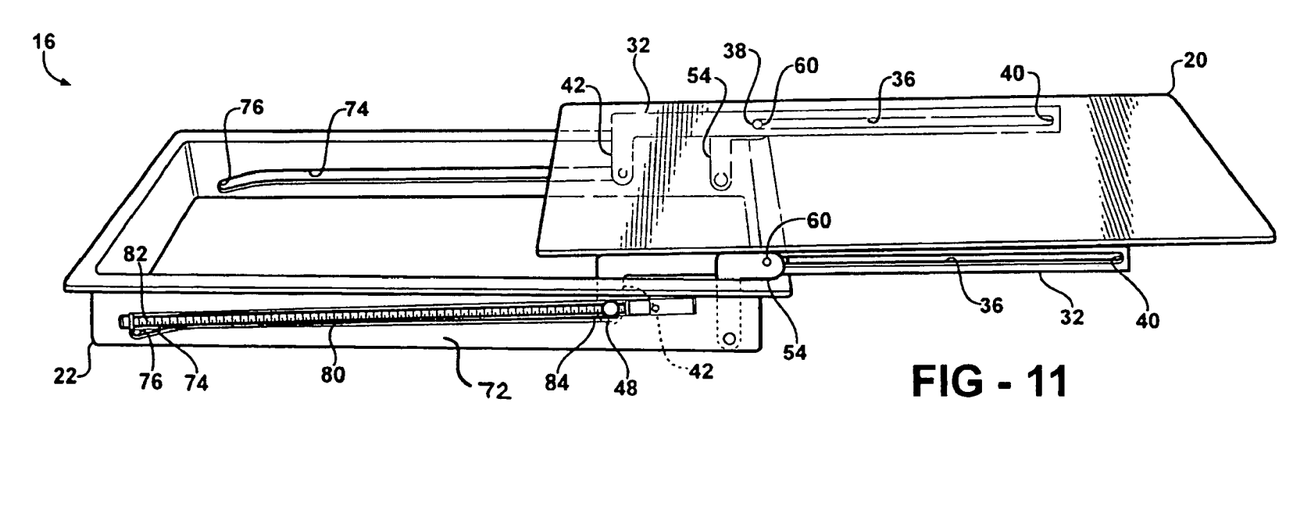
FIG. 11 is an isolated side perspective view of the closure panel assembly with the panel in the open position.

The L-shaped hinge bracket 54 pivots between a retracted position, shown in FIG. 7, and an upright position, shown in FIGS. 10 and 11. When the L-shaped hinge bracket 54 is in the retracted position, the panel 20 is in a closed position. When the L-shaped hinge bracket 54 is in the upright position, the panel 20 is raised above the roof 12 to provide clearance for the panel 20 as the panel 20 slides relative to the frame 22 into and out of an open position.

Referring once again to FIG. 3, a wheel 64 is positioned within the portion of the channel 57 extending through the second leg 58. The wheel 64 is moved into a camming relationship with the sliding bracket 32 when the L-shaped hinge bracket 54 is pivoted to the upright position. The wheel 64 urges the sliding bracket 32 over the upper lip 61. The sliding bracket 32 also slides over the wheel 64 relative to the first pin 60, as the panel 20 moves to its open position when the L-shaped hinge bracket 54 is in the upright position. Thus, the motion of the first pin 60 with respect to the elongated slot 36 is achieved as a function of the position of the hinge bracket 54.

Figure 4:
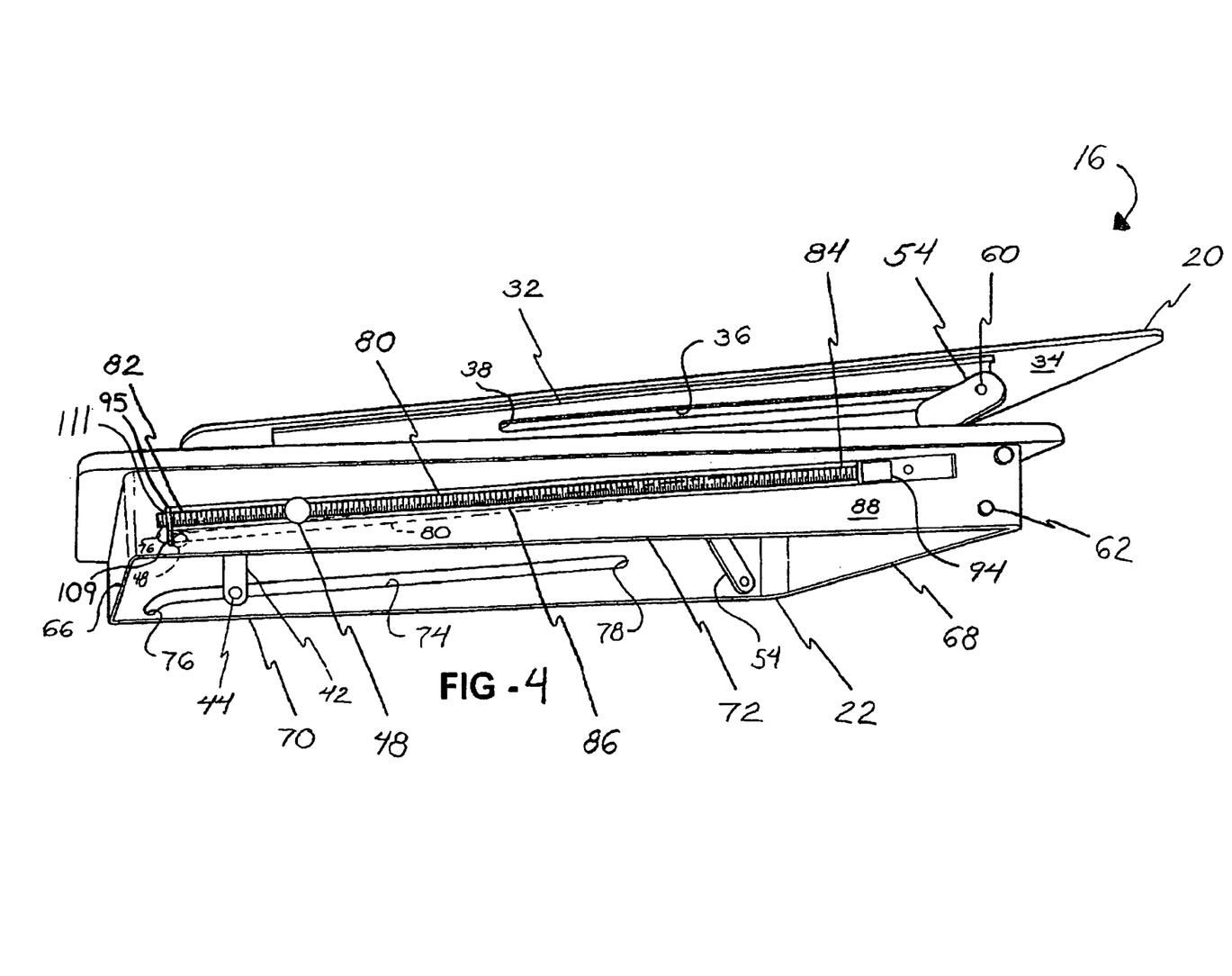
FIG. 4 is an isolated side perspective view of a frame of the closure panel assembly including the panel thereof raised relative to the frame.

Referring to FIG. 4, the frame 22 includes a forward wall 66, a rearward wall 68, and opposing longitudinal walls 70, 72 extending therebetween. The longitudinal walls 70, 72 each include a guide slot 74 extending through a curved path between a forward end 76 and a rearward end 78. In the embodiment shown, much of the curve in the path is disposed adjacent the forward end 76. The forward end 76 is positioned along each of the longitudinal walls 70, 72 at a height different from that of the rearward end 78. In a preferred embodiment, the guide slot 74 extends at an angle with respect to the frame 22 such that is rises as it extends from the forward end 76 to the rearward end 78.

The invention described to this point defines kinematics of the closure panel assembly 16, and a drive for moving the panel 20 between the open and closed positions may be manually operated or power activated.

For power operation, the drive includes a rotatable lead screw 80 disposed adjacent the longitudinal wall 72. The lead screw 80 extends between a first end 82 and a second end 84. Although reference is being made only to one of the longitudinal walls 72, it will be appreciated that the following applies equally to the other longitudinal wall 70. The lead screw 80 defines a length generally equal to that of the guide slot 74.

Figure 5:
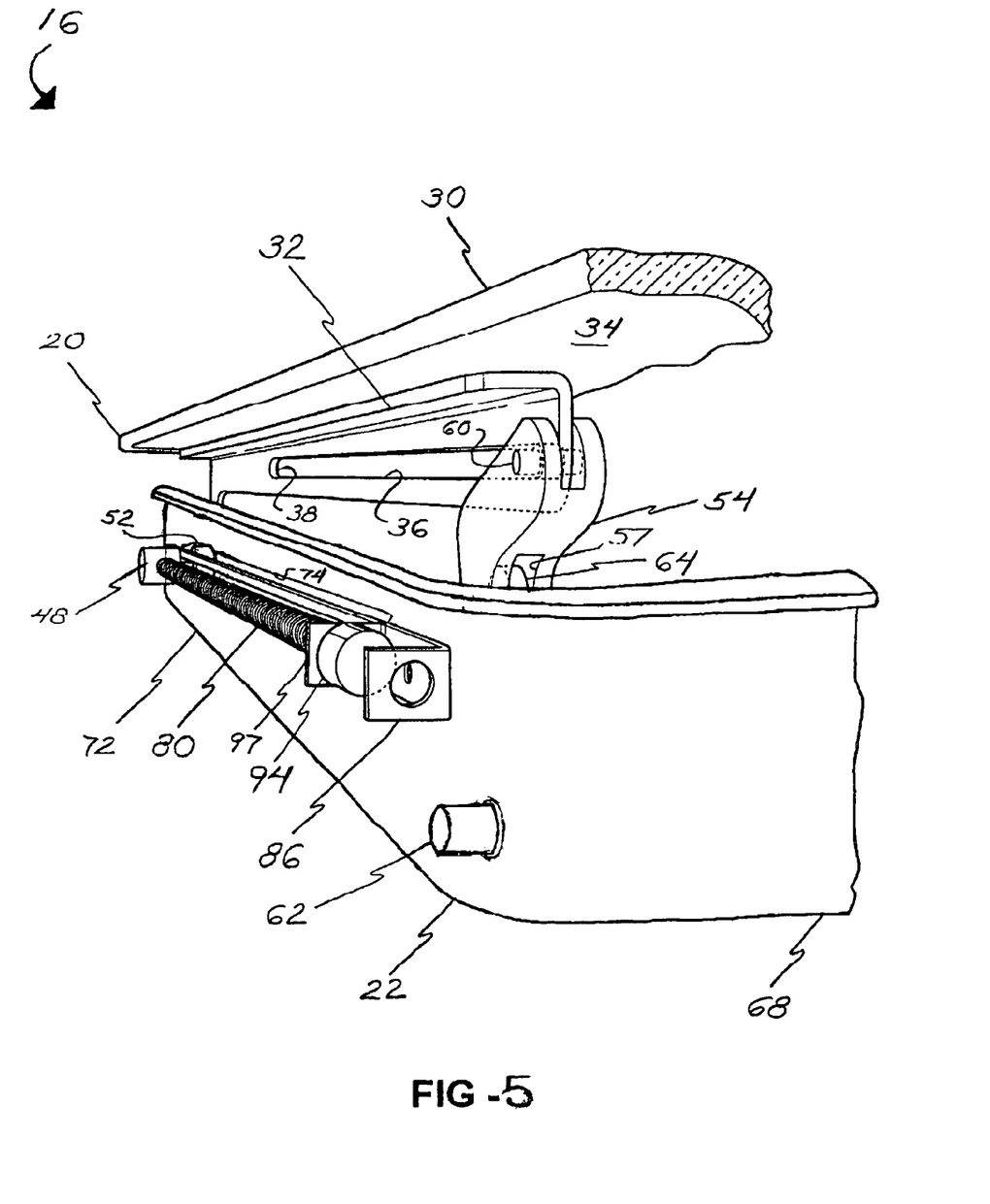
FIG. 5 is rear, fragmentary, perspective view similar to FIG. 3 further including the frame and a lead screw disposed adjacent the frame.
Figure 6:
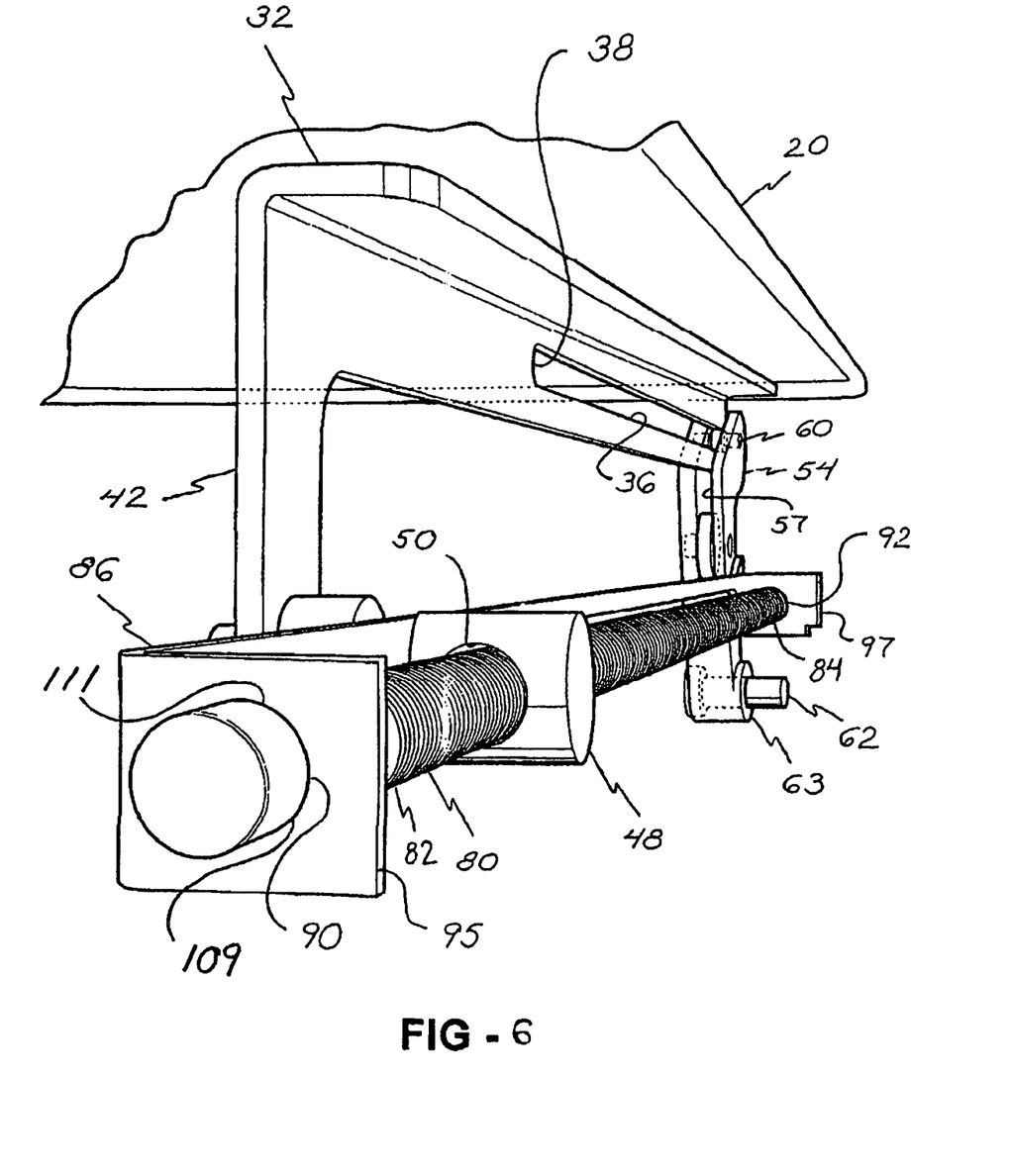
FIG. 6 is a front, fragmentary, perspective view of the panel including a sliding bracket having a drive nut threadingly engaging the lead screw, which is shown isolated from the frame.

Referring to FIGS. 5 and 6, the drive nut 48 threadedly engages the lead screw 80. More specifically, the lead screw 80 extends through the threaded through-hole 50 of the drive nut 48 so that rotation of the lead screw 80 will cause the drive nut 48 to move therealong between the first 82 and second 84 ends, which will drive the panel 20 between the closed and open positions. At the same time that the drive nut 48 moves along the lead screw 80, the shank 46 slides within the guide slot 74 between the forward 76 and rearward 78 ends.

The lead screw 80 is retained adjacent to the longitudinal wall 72 by a mounting bracket 86. A rear end 97 of the mounting bracket 86 is pivotally secured along an outboard surface 88 of the longitudinal wall 72. The mounting bracket 86 includes front 90 and rear 92 openings for receiving the lead screw 80. The lead screw 80 is fixedly secured to the mounting bracket 86 such that as the mounting bracket 86 pivots, the lead screw 80 moves with the mounting bracket 86. Therefore, when the panel 20 moves to its closed position, and the shank 46 is moving through the curved path towards the forward end 76 of the guide slot 74, the mounting bracket 86 pivots so that a front end 95 thereof as well as the first end 82 of the lead screw 80 drop downwards. As a result, the panel 20 is brought into tight, sealing engagement with the frame 22. When the panel 20 moves to its open position, the mounting bracket 86 pivots so that the front end 95 thereof, and with it the first end 82 of the lead screw 80, is urged upwards. Thus, the movement of the drive nut 48 along the lead screw 80 approximates the movement of the shank 46 through the curved path of the guide slot 74. The lead screw 80 cooperates with the L-shaped hinge bracket 54 in the initial raising of the panel 20 above to the frame 22.

A reversible motor 94 is mounted along the mounting bracket 86 and is operatively connected to the lead screw 80. Preferably, a single motor drives a pair of flexible cables that are operably connected to an end of the lead screw 80 effecting rotation thereof. Upon activation, the motor 94 will rotate the lead screw 80 in either a clockwise or counterclockwise direction.

The operation of the closure panel assembly 16 will now be described with reference to FIGS. 7 through 11. Referring first to FIG. 7, when the panel 20 is in the closed position, the drive nut 48 is positioned at the first end 82 of the lead screw 80, which abuts a lower end 109 of the front opening 90. In addition, the spacer 52 is located at the forward end 76 of the guide slot 74, the first pin 60 abuts the rearward end 40 of the elongated slot 36, and the L-shaped hinge bracket 54 is in its retracted position.

Figure 8:
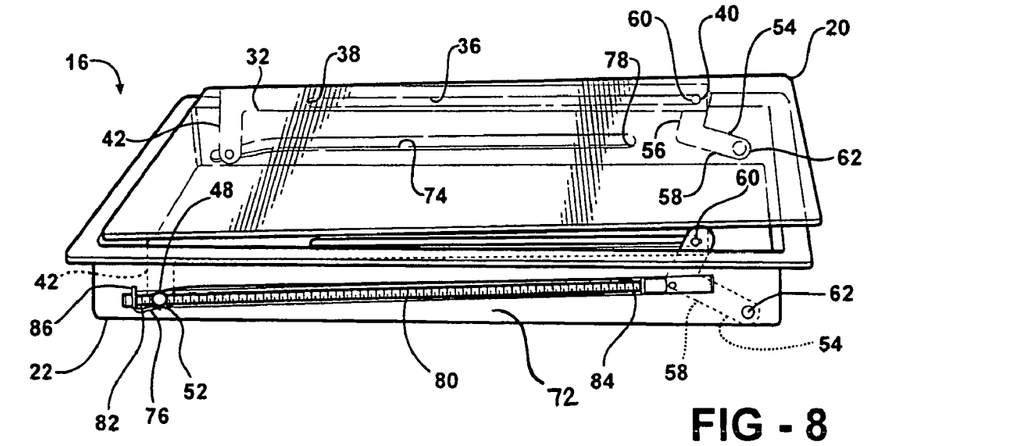
FIG. 8 is an isolated, perspective view of the closure panel assembly with the panel in a partially open position in which the drive nut has moved away from a front end of the lead screw.

Referring to FIG. 8, the drive nut 48 moves towards the second end 84 of the lead screw 80 upon rotation thereof, thus moving the panel 20 out of its closed position. As the panel 20 moves out of its closed position, the spacer 52 moves out of the forward end 76 of the guide slot 74 through the curved path thereof. At the same time, the first end 82 of the lead screw 80 is raised to abut an upper end 111 of the front opening 90. The panel 20 moves initially through the curved path of the forward end 76 of the guide slot 74 and is raised above the frame 22. The rearward movement of the panel 20 drives the L-shaped hinge bracket 54 to pivot out of its retracted position (since at this point the sliding bracket 32 engages the upper lip 61 of the L-shaped hinge bracket 54). Specifically, the L-shaped hinge bracket 54 pivots about the second pin 62 relative to the frame 22.

Figure 9:
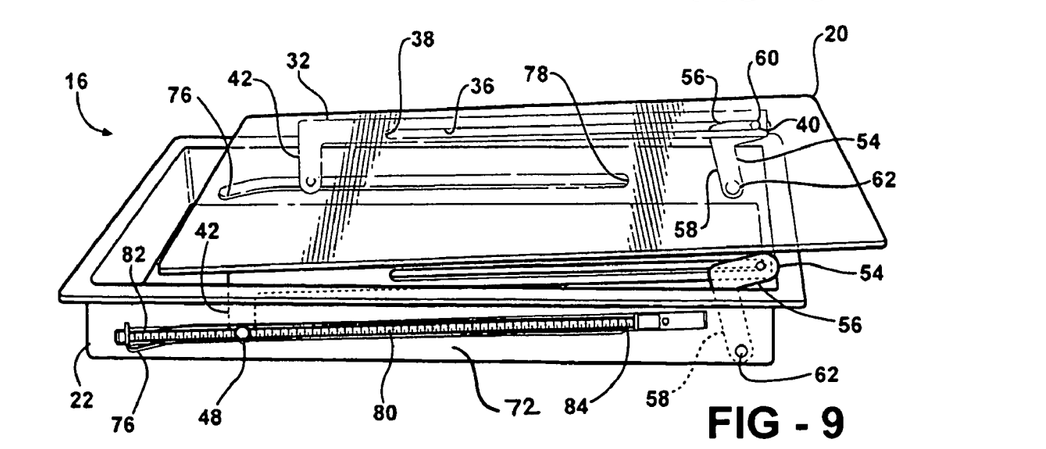
FIG. 9 is an isolated, perspective view of the closure panel assembly with the drive nut further along the lead screw.

Referring to FIG. 9, the drive nut 48 continues to move along the lead screw 80 towards the second end 84 thereof, thus further moving the panel 20 to its open position. In addition, the L-shaped hinge bracket 54 continues to rotate towards its upright position, further raising the panel 20 relative to the frame 22.

Referring to FIG. 10, the L-shaped hinge bracket 54 is in its upright position. At this time, the wheel 64 disposed within the channel 65 engages the sliding bracket 32 and urges it over the upper lip 61 of the L-shaped hinge bracket 54. Rotary movement of the panel 20 is now complete and from this point on, the panel 20 will only slide rearward towards the open position, shown in FIG. 11. The sliding bracket 32 slides relative to the first pin 60 until it abuts the front end 38 of the elongated slot 36. At the same time that the first pin 60 contacts the front end 38 of the elongated slot 36, the drive nut 48 moves to the second end 84 of the lead screw 80 and the spacer 52 moves to the rearward end 78 of the guide slot 74 so that the panel 20 is in its open position.

It will be appreciated that although the closure panel assembly 16 is shown with regard to a panel and an opening of a roof, the closure panel assembly 16 may also be utilized with various other panels including, but not limited to, vertical and horizontal sliding doors, decklids, glass panels, sun visors, and vertical gates. Certain other advantages of this invention may be appreciated including a panel inherently secured closed by its four corners, a downward motion of the panel at full closure to assist in positive compression of a seal, and a simple, more easily powered mechanism that achieves a tilt and slide motion for a panel.

The invention has been described in an illustrative manner. It is to be understood that the terminology, which has been used, is intended to be in the nature of words of description rather than of limitation. Many modifications and variations of the invention are possible in light of the above teachings and thus the invention may be practiced other than as specifically described.

What is claimed:

1. A closure panel assembly for selectively covering an opening formed in a roof of a motor vehicle, said closure panel assembly comprising:
    a frame disposed around the opening of the roof and having a longitudinal wall including a curved guide slot extending between a forward end and a rearward end;
    a drive disposed along said longitudinal wall of said frame;
    a panel operably connected to said drive, said panel movable relative to said frame for selectively covering the opening;
    a sliding bracket secured to said panel and extending through said guide slot, said sliding bracket including a drive nut engaging said drive such that activation of said drive allows for movement of said drive nut therealong to move said panel between an open position and a closed position and
    an L-shaped hinge bracket having a first leg pivotally secured to said sliding bracket, a second leg pivotally secured to said longitudinal wall, and a channel extending between said first and second legs such that sliding of said panel between said open and closed positions pivots said hinge bracket between an upright position, in which said panel is raised from said roof, and a retracted position, in which said panel is in said closed position, said first leg defining an upper lip over which said sliding bracket moves to facilitate movement of said panel between said open and closed positions.

2. A closure panel assembly as set forth in claim 1 wherein said drive includes a lead screw disposed adjacent said longitudinal wall and movable with respect thereto.

3. A closure panel assembly as set forth in claim 1 including a wheel disposed within said channel for urging said sliding bracket over said upper lip.

4. A closure panel assembly as set forth in claim 3 wherein said sliding bracket includes an elongated slot extending between first and second ends.

5. A closure panel assembly as set forth in claim 4 wherein said L-shaped hinge bracket includes a first pin extending within said elongated slot of said sliding bracket to pivot said L-shaped bracket hinge relative to said panel.

6. A closure panel assembly for selectively covering an opening formed in a roof of a motor vehicle, said closure panel assembly comprising:
    a frame disposed around the opening of the roof and having a longitudinal wall including a curved guide slot extending between a forward end and a rearward end;
    a drive disposed along said longitudinal wall of said frame, said drive vertically adjustable relative to said longitudinal wall;
    a panel operably connected to said drive, said panel movable relative to said frame for selectively covering the opening;
    a sliding bracket secured to said panel and extending through said guide slot to engage said drive such that movement of said sliding bracket within said guide slot allows for movement of said panel between an open position and a closed position; and
    a mounting bracket having a rear end pivotally coupled to said longitudinal wall and fixedly secured to said drive for vertically adjusting said drive relative to said longitudinal wall as said sliding bracket moves between said forward and rearward ends of said curved guide slot;
    whereby movement of said sliding bracket into said forward end of said curved guide slot pivots said mountain bracket relative to said longitudinal wall to lower said drive to effect a tight sealing engagement between said panel and said frame when said panel is in said closed position.

7. A closure panel assembly as set forth in claim 6 wherein said drive includes a lead screw disposed adjacent said longitudinal wall.

* * * * *